United States Patent
Lo et al.

(10) Patent No.: US 9,749,595 B2
(45) Date of Patent: Aug. 29, 2017

(54) SECURITY SYSTEM AND METHOD THEREOF

(71) Applicant: Metalligence Technology Corporation, Hsinchu (TW)

(72) Inventors: Ming-Ling Lo, New Taipei (TW); Shih-Chiea Chen, New Taipei (TW)

(73) Assignee: METALLIGENCE TECHNOLOGY CORPORATION, Hsinchu (TW)

( * ) Notice: Subject to any disclaimer, the term of this patent is extended or adjusted under 35 U.S.C. 154(b) by 289 days.

(21) Appl. No.: 14/613,346

(22) Filed: Feb. 3, 2015

(65) Prior Publication Data

US 2015/0237310 A1    Aug. 20, 2015

Related U.S. Application Data

(60) Provisional application No. 61/939,749, filed on Feb. 14, 2014.

(51) Int. Cl.
*H04N 7/18* (2006.01)
*H04W 4/14* (2009.01)
*G08B 13/196* (2006.01)

(52) U.S. Cl.
CPC ....... *H04N 7/181* (2013.01); *G08B 13/19695* (2013.01); *H04N 7/188* (2013.01); *H04W 4/14* (2013.01)

(58) Field of Classification Search
CPC .. H04N 7/181; H04N 7/188; G08B 13/19695; H04W 4/14
See application file for complete search history.

(56) References Cited

U.S. PATENT DOCUMENTS

| | | | |
|---|---|---|---|
| 8,644,702 B1* | 2/2014 | Kalajan | H04N 21/64784 396/429 |
| 2004/0021778 A1* | 2/2004 | Oldani | G08B 13/1963 348/211.99 |
| 2009/0189981 A1* | 7/2009 | Siann | H04N 7/183 348/143 |
| 2015/0022666 A1* | 1/2015 | Kay | H04L 67/025 348/159 |

* cited by examiner

*Primary Examiner* — Sath V Perungavoor
*Assistant Examiner* — Howard D Brown, Jr.
(74) *Attorney, Agent, or Firm* — CKC & Partners Co., Ltd.

(57) ABSTRACT

The security system comprises a monitoring sensor, a video camera, a cloud server and a wireless transceiver module coupling with the video camera through a DIDO terminal port. The monitoring sensor senses a triggering event to generate a status signal to transfer to the video camera through the wireless transceiver module. The status signal changes a logical state of the DIDO terminal port to trigger the video camera to perform a security process to generate a notification.

17 Claims, 5 Drawing Sheets

SECURITY SYSTEM AND METHOD THEREOF

RELATED APPLICATIONS

This application claims the priority benefit of U.S. Provisional Application Ser. No. 61/939,749, filed Feb. 14, 2014, the entirety of which is herein incorporated by reference.

BACKGROUND

Field of Invention

The invention relates to a security system, and particularly relates to a gateway-less security system and method thereof.

Description of Related Art

FIG. 1 illustrates a traditional security system. The traditional security system 100 includes a security gateway 110, monitoring sensors 120 and video camera 130. The monitoring sensors 120 and video cameras 130 are disposed in an office environment, a nursery, or even in daily life. The monitoring sensors 120 sense the environment and generate a status signal. The video cameras 130 capture videos of the environment. The security gateway 110 receives both status signal and videos from the monitoring sensors 120 and video cameras 130 respectively. When the monitoring sensors 120 detect alert conditions, the video cameras 130 are triggered to capture videos. Then, the triggered status signal and videos are sent to the security gateway 110 to notify a home owner 140.

However, the cost of the traditional security system 100 is high and the installation process of the traditional security system 100 is complex for a home owner, which limits the development of the traditional security system 100. Therefore, there is a need for a new security system to reduce the cost and to simplify the installation process of the security system.

SUMMARY

Accordingly, the invention provides a security system. The security system comprises a monitoring sensor, a wireless transceiver module and a video camera. The monitoring sensor senses a triggering event to generate a status signal. The wireless transceiver module wireless receives the status signal. The video camera has a DIDO terminal port. The wireless transceiver module couples with the video camera through the DIDO terminal port. The status signal is transferred to the video camera through the DIDO terminal port. The status signal changes a logical state of the DIDO terminal port to trigger the video camera to perform a security process in response to the triggering event to generate a notification.

In an embodiment, the security process further comprises a cloud server to receive the notification to notify a portable device the triggering event. The notification is directly transferred to the cloud server from the video camera.

In an embodiment, the video camera performs the security process to send a notification message to the cloud server, and to capture video of the surrounding environment.

In an embodiment, the video camera captures the video to transfer to the cloud server to store.

In an embodiment, the video camera further comprises a WIFI or an Ethernet interface to upload the video captured by the video camera to the cloud server to store.

In an embodiment, the cloud server notifies the portable device through an APP, an Email, a Short Message Service (SMS) or a Multimedia Messaging Service (MMS).

In an embodiment, the video camera is an IP-based camera.

In an embodiment, the portable device is a mobile phone, a laptop computer or a tablet computer.

In an embodiment, the monitoring sensor is a contact sensor, a motion sensor, or a vibration sensor.

The present invention also provides a security method. First, a triggering event is sensed to generate a status signal by a monitoring sensor. Next, the status signal is wireless transferred to a wireless transceiver module from the monitoring sensor. The wireless transceiver module is coupled to a video camera through a DIDO terminal port. The status signal is transferred to the video camera through the DIDO terminal port. Then, a logical state of the DIDO terminal port is changed in response to the status signal to trigger the video camera to perform a security process to generate a notification.

In an embodiment, the security process further comprises to directly transfer the notification to the cloud server from the video camera, and the cloud server notifies a portable device the triggering event according to the received notification from the video camera.

In an embodiment, the security process further comprises to send a notification message to the cloud server from the video camera, and to capture video by the video camera.

In an embodiment, the method further comprises to store the video captured by the video camera in the cloud server.

In an embodiment, the method further comprises to access the video stored in the cloud server by the portable device.

In an embodiment, the method further comprises to access the video camera through the cloud server by the portable device for live viewing.

In an embodiment, the method further comprises to use an APP, an Email, a Short Message Service (SMS) or a Multimedia Messaging Service (MMS) to notify the portable device by the cloud server.

Accordingly, the security system of the present invention eliminates the gateway device. Therefore, not only the cost of the security system is reduced, but also the installation process of the security system is simplified. Moreover, the security system of the present invention leverages the data processing capabilities from the video camera to offer the same functionalities. Therefore, no additional changes or modifications are required to the monitoring sensors and video camera.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
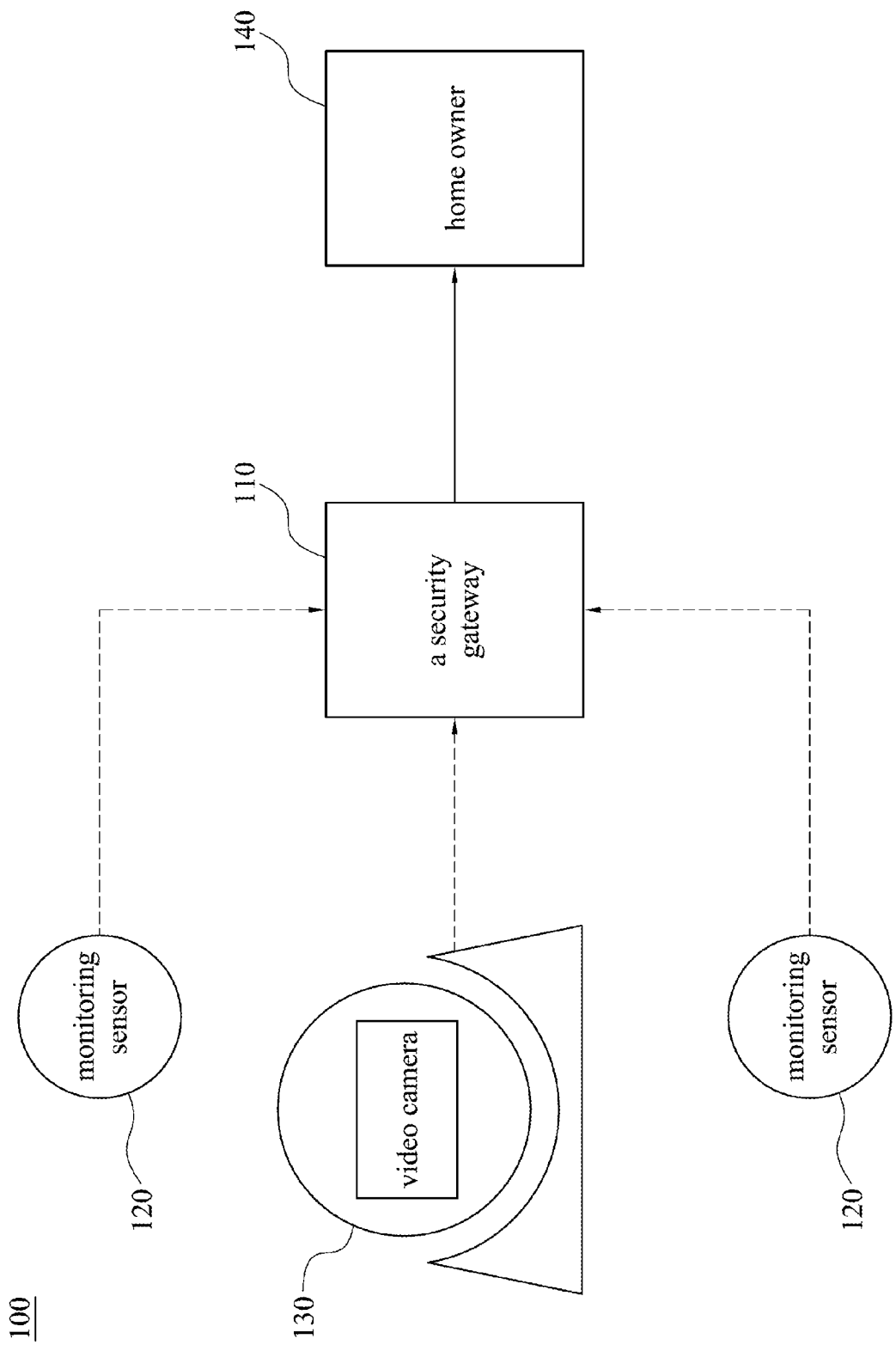
FIG. 1 illustrates a traditional security system.

Reference will now be made in detail to the present embodiments of the invention, examples of which are illustrated in the accompanying drawings. Wherever possible, the same reference numbers are used in the drawings and the description to refer to the same or like parts.

Figure 2:
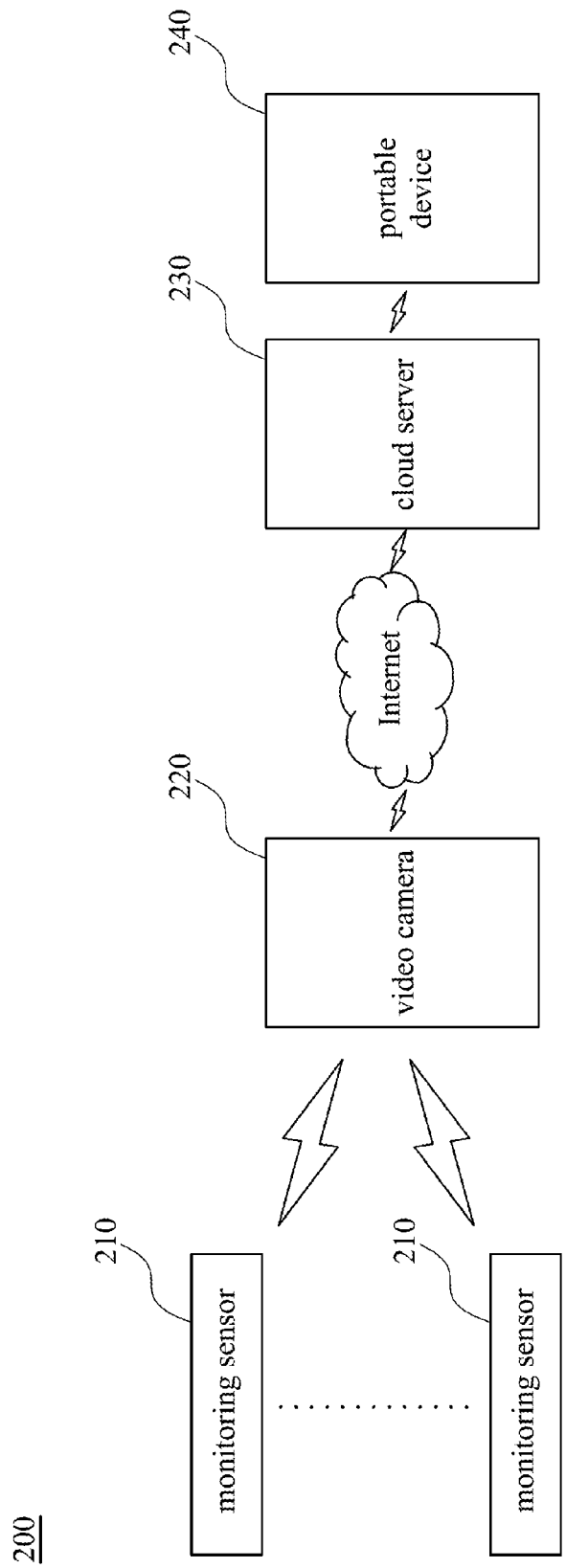
FIG. 2 illustrates a security system according to an embodiment of the invention.
Figure 3:
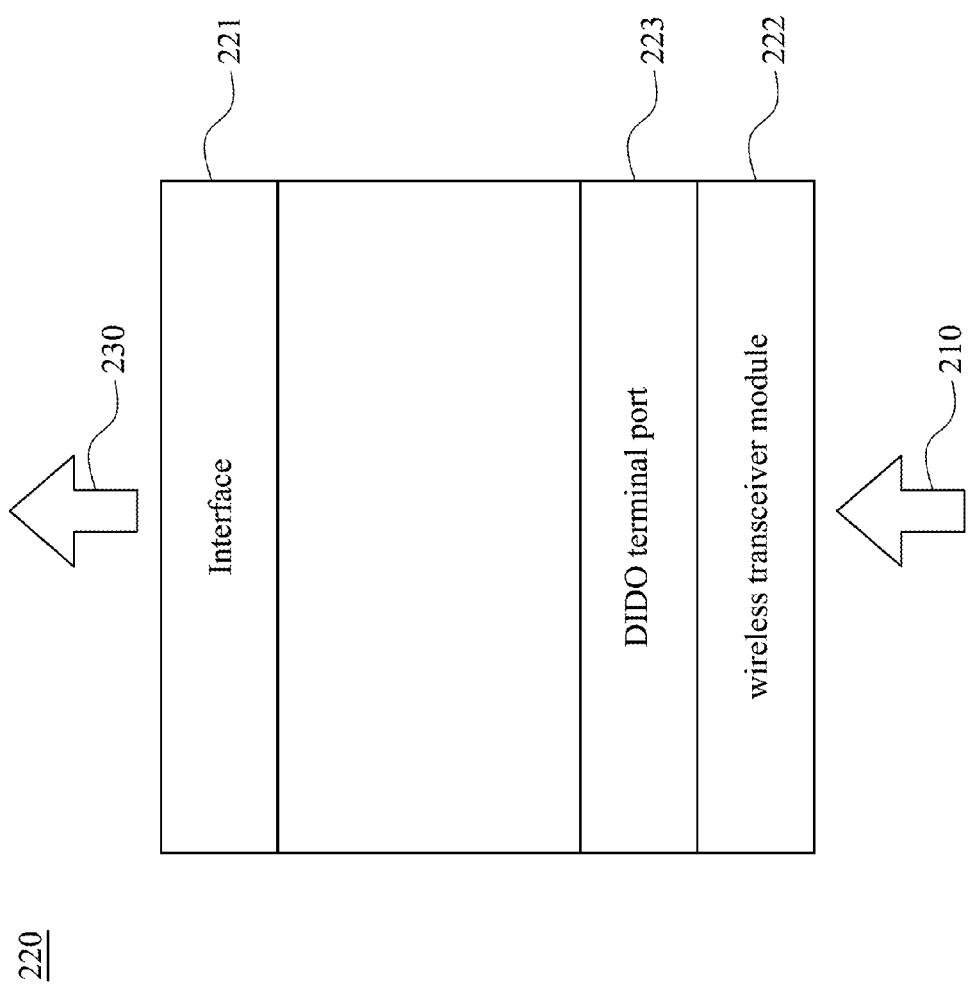
FIG. 3 is a schematic diagram of the video camera according to an embodiment of the invention.

FIG. 2 illustrates a security system according to an embodiment of the invention. The security system 200 of the present invention comprises monitoring sensors 210 and a video camera 220. The monitoring sensors 210 act as the environment watchdogs for monitoring the changes of the environment to generate status signal when a triggering event happened. In an embodiment, the type of monitoring sensors 210 will be battery-powered and communicate with the video camera 220 through wireless signals. In other words, the monitoring sensor 210 is a wireless sensor. The type of the monitoring sensors 210 is contact sensor, motion sensor, or vibration sensor. However, in other embodiment, other type of monitoring sensor may be also used in the present invention, and the present invention is not limited to the type of monitoring sensor. The status signal generated by the monitoring sensors 210 is transferred to the video camera 220 to notify the video camera 220 a triggering event happening. Then, the video camera 220 performs a security process in response to the triggering event. Moreover, the security system further comprises a cloud server 230 to directly communicate with the video camera 220 through an Internet link. The cloud server 230 is a network server that is built, operated and accessed remotely through internet. The present invention is not limited to the type of the cloud server. Therefore, the notification from the video camera 220 can be transferred to a remote portable device 240 from the cloud server 230. In an embodiment, the security process either sends a notification message to the cloud server 230, or the video camera 220 starts to capture video, or both. The cloud server 230 receives the notification message or the captured video file from the video camera 220 through Internet. Then, the cloud server 230 may notify the end user about the triggering events through the portable device 240 or other devices. The cloud server 230 also stores the captured video files which are uploaded from the video camera 220. In an embodiment, a cloud-based application software installing and operating in the cloud server 230 performs the above function. The cloud-based application software provides UI/UX front-end applications to the end users. The application can be mobile applications, web applications, or PC applications which the end users can use the portable device 240 to receive and retrieve the status about their home form the cloud server 230. In an embodiment, the video camera 220 is an IP-based camera. Through a standard IP network configuration, the video camera 220 can communicate with the cloud server 230. By using the standard IP network configuration as the link connectivity, a portable device 240 can utilize the existing broadband internet services to communicate with the security system 100 without any additional or proprietary network configuration. In an embodiment, the portable device 240 is a mobile phone, a laptop computer or a tablet computer. In another embodiment, when the user is in a location near the video camera 220 and a portable device of the user can directly receive notification from the video camera 220, it is not necessary for the security system 200 to use a cloud server 230 to transfer notification to the user. The user can directly communicate with the video camera 220 to receive the notification. Therefore, in this embodiment, the cloud server 230 is an optional apparatus for the security system 200. FIG. 3 is a schematic diagram of the video camera according to an embodiment of the invention. The video camera 220 has an interface 221 and a DIDO terminal port 223. The video camera 220 uses the interface 221 for connection with other devices, data link to the cloud server 230 to upload the captured video files, and update the received status signal from the monitoring sensors 210. Also, the video camera 220 utilizes the interface 221 to receive the commands from the cloud server 230. The interface 221 is a WIFI or an Ethernet interface, but the present invention is not limited to the aforesaid. On the other hand, the video camera 220 uses the DIDO terminal port 223 to connect with a wireless transceiver module 222. Then, the monitoring sensors 210 may wireless communicate with the video camera 220 through the wireless transceiver module 222. The status signal generated by the monitoring sensors 210 is transferred to the wireless transceiver module 222. Then, the status signal changes the logic state of pin in the DIDO terminal port 223 to trigger the video camera 220 for capturing video.

Figure 4:
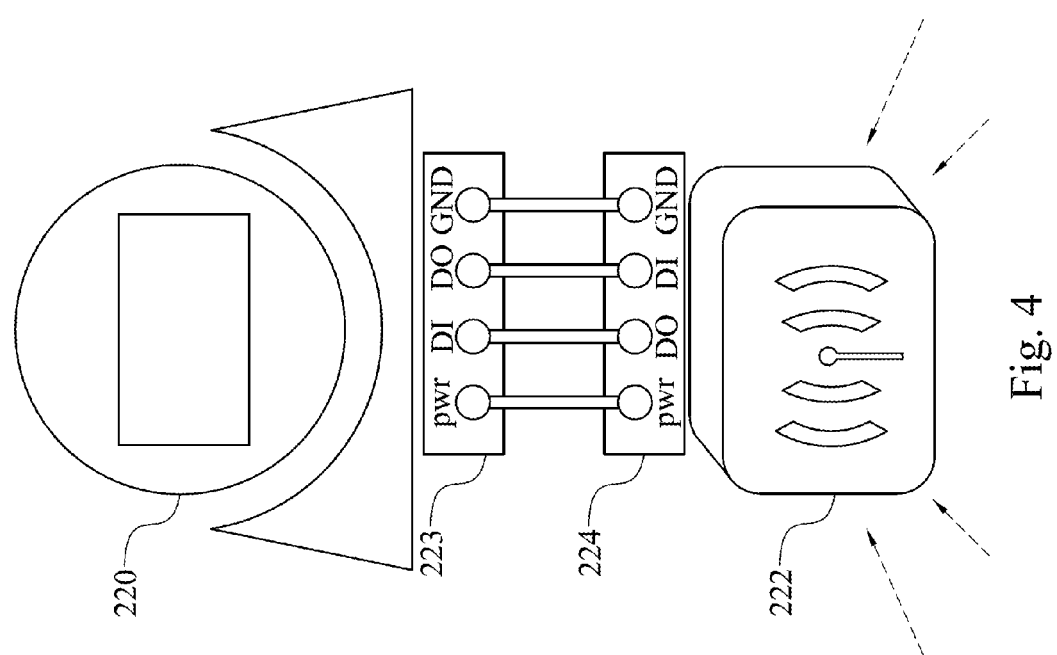
FIG. 4 illustrates the connection between the video camera and the wireless transceiver module according to an embodiment of the invention.

FIG. 4 illustrates the connection between the video camera 220 and the wireless transceiver module 222 according to an embodiment of the invention. The wireless transceiver module 222 has a DIDO terminal port 224 to connect with the DIDO terminal port 223 of the video camera 220. By the connection of the DIDO terminal port 224 and 223, the video camera 220 and the wireless transceiver module 222 are connected together. In general, a DIDO terminal port 224 or 223 has four pins, a power pin, a ground pin, a DI pin for digital input and a DO pin for digital output. Consequently, the DIDO terminal port 224 could be implemented by two IO pins or GPIO (General Purpose Input Output) pins easily. The status signal received by the wireless transceiver module 222 is outputted from the DO pin of the DIDO terminal port 224 to the DI pin of the DIDO terminal port 223 in the video camera 220. Then, the video camera 220 detects a change in the logic state of the DI pin. In an embodiment, the change logic state of the DI pin can trigger the video camera 220 to perform security process, such as to record a video or to send a notification message to the cloud server 230. Accordingly, when the wireless transceiver module 222 receives the status signal from the monitoring sensors 210, the wireless transceiver module 222 will change the DO pin logic state of the DIDO terminal port 224 so as to change the DI pin logic state of the DIDO terminal port 223, for example, pull high the voltage level on the pin. Then, the video camera 220 detects a change in the logic state of the DI pin of the DIDO terminal port 223, which will trigger the video camera 220 to perform security process. In other words, the change in the logic state of the DI pin of the DIDO terminal port 223 will notify the video camera 220 that there is a sensor trigger event happening. Then, the video camera 220 will perform following security process, either sending a notification message to the cloud server 230, or start a video capturing, or both.

In an embodiment, when the cloud server 230 receives the notification message, the cloud server 230 may notify the end user through the portable device 240. The notification message is a real-time notification. Therefore, the end user may immediately know, such as, there is an intrusion event happening. In an embodiment, the notification message is sent to the end user through an APP, an Email, a Short Message Service (SMS) or a Multimedia Messaging Service (MMS). However, other notifying methods also can be used in the present invention. On the other hand, in another embodiment, when the video camera 220 is enabled with the video capturing function, during a triggering event, the video camera 220 will start a real-time video recording to capture the activities. In an embodiment, the video file captured by the video camera 220 may be sent to the cloud server 230 for storing through a standard FTP protocol or other data transferring protocol. Therefore, the end user can sends a request through the portable device 240 to the cloud server 230 to access the video file after the triggering event. Moreover, the end user also can send a request through the portable device 240 to the cloud server 230 to access the video camera 220 for live viewing. In this embodiment, the cloud server 220 passes the live viewing request from the portable device 240 to the video camera 220. Moreover, aforementioned cloud-based application software are also executed and controlled by the end user through the portable device 240. When the video camera 220 receives the live viewing request, the video camera 220 passes the live viewing stream to the portable device 240 through the cloud server 230. Therefore, the end user can view the live viewing through the portable device 240.

Figure 5:
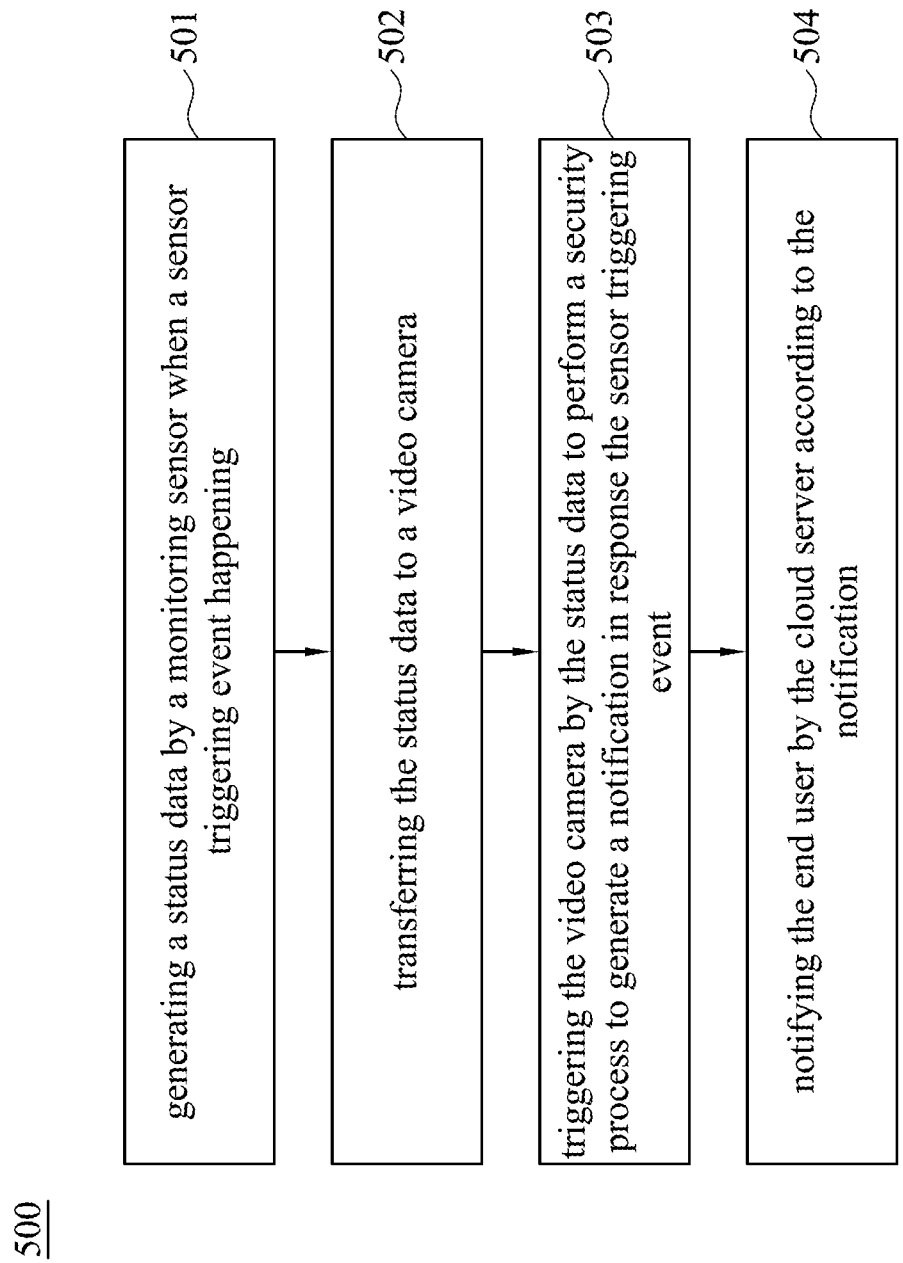
FIG. 5 illustrates a security method according to an embodiment of the invention.

FIG. 5 illustrates a security method according to an embodiment of the invention. Please refer to FIG. 2 and FIG. 5. According to the security method 500, especially applied without gateway, in step 501, a status signal is generated when a triggering event happening. In an embodiment, when a triggering event happening, the event triggers the monitoring sensors 210 to generate the environment status signal. Next, in step 502, the status signal is transferred to a video camera to notify the video camera that triggering event occurs. In an embodiment, the status signal is transferred to the wireless transceiver module 222 that is connected to the video camera 220 through a DIDO terminal port 223. Then, in step 503, the status signal triggers the video camera to perform a security process to generate a notification in response the triggering event. In an embodiment, the status signal changes the logic state of the DI pin of the DIDO terminal port 223 to trigger the video camera 220 in response to the triggering event. Moreover, the security method further comprises the following steps: directly communicating with the video camera 220 through an Internet by a cloud server 230, transferring the notification from the video camera 220, and transferring the notification to a remote portable device 240 via the cloud server. Therefore, the video camera 220 performs a security process, including generating a notification message, transferring the notification message to a cloud server 230, or/and starting to capture a video. Accordingly, in step 504, the cloud server 230 may notify the end user according to the received notification message. However, in another embodiment, when the user is in a location near the video camera 220 and a portable device of the user can directly receive notification from the video camera 220, it is not necessary for the security system 200 to transfer notification to the user through a cloud server 230. The user can directly communicate with the video camera 220 to receive the notification.

Accordingly, according to the present invention, the security system and method thereof eliminate the traditional gateway device. Therefore, not only the cost of the security system is reduced, but also the installation process of the security system is simplified. Moreover, the security system of the present invention leverages the data processing capabilities from the video camera to offer the same functionalities. Therefore, no additional changes or modifications are required to the monitoring sensors and video camera.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A security system, comprising:
a monitoring sensor sensing a triggering event to generate a status signal;
a wireless transceiver module receiving the status signal, wherein the wireless transceiver module has a first DIDO terminal port; and
a video camera having a second DIDO terminal port directly coupling with the first DIDO terminal port of the wireless transceiver module, wherein the wireless transceiver module directly transfers the status signal to the video camera through the first DIDO terminal port and the second DIDO terminal port, wherein when the wireless transceiver module receives the status signal, the status signal changes a logical state of a DO pin of the first DIDO terminal port, and the change of the logical state of the DO pin of the first DIDO terminal port changes a logical state of a DI pin of the second DIDO terminal port to trigger the video camera to perform a security process in response to the triggering event to generate a notification.

2. The security system of claim 1, further comprising a cloud server to receive the notification to notify a portable device the triggering event, wherein the notification is directly transferred to the cloud server from the video camera.

3. The security system of claim 2, wherein the cloud server notifies the portable device through an APP, an Email, a Short Message Service (SMS) or a Multimedia Messaging Service (MMS).

4. The security system of claim 2, wherein the video camera performs the security process further by sending a notification message to the cloud server, and capturing video.

5. The security system of claim 4, wherein the video camera further transfers the captured video to the cloud server.

6. The security system of claim 5, wherein the video camera further comprises a WIFI or an Ethernet interface to transfer the captured video to the cloud server.

7. The security system of claim 2, wherein the cloud server further comprises a UI/UX front-end application provided to the portable device, wherein the UI/UX front-end applications is a mobile application, a web application, or a PC application.

8. The security system of claim 1, wherein the video camera is an IP-based camera.

9. The security system of claim 1, wherein the portable device is a mobile phone, a laptop computer or a tablet computer.

10. The security system of claim 1, wherein the monitoring sensors is a contact sensor, a motion sensor, or a vibration sensor.

11. A security method for a security system without a gateway, comprising:

sensing a triggering event to generate a status signal by a monitoring sensor;

transferring the status signal by the monitoring sensor to a wireless transceiver module, wherein the wireless transceiver module has a first DIDO terminal port directly coupling with a second DIDO terminal port of a video camera;

transferring the status signal to the video camera by the wireless transceiver module through the first DIDO terminal port and the second DIDO terminal port; and changing a logical state of a DO pin of the first DIDO terminal port in response to the status signal, and the change of the logical state of the DO pin of the first DIDO terminal port changes a logical state of a DI pin of the second DIDO terminal port to trigger the video camera to perform a security process to generate a notification.

12. The security method of claim 11, further comprising: receiving the notification by a cloud server to notify a portable device the triggering event, wherein the notification is directly transferred from the video camera.

13. The security method of claim 12, further comprises: sending a notification message to the cloud server from the video camera, and capturing video by the video camera.

14. The security method of claim 13, further comprising: storing the video captured by the video camera in the cloud server.

15. The security method of claim 14, further comprising: accessing the video stored in the cloud server by the portable device.

16. The security method of claim 12, further comprising: accessing the video camera through the cloud server by the portable device for live viewing.

17. The security method of claim 12, further comprising: utilizing an APP, an Email, a Short Message Service (SMS) or a Multimedia Messaging Service (MMS) to notify the portable device by the cloud server.

* * * * *